United States Patent [19]

Enrich

[11] 4,404,767
[45] Sep. 20, 1983

[54] PLANT GROWING APPARATUS

[76] Inventor: Carlos W. Enrich, 11390 - 96th Ave., Delta, British Columbia, Canada, V4C 2W5

[21] Appl. No.: 317,784

[22] Filed: Nov. 3, 1981

[51] Int. Cl.$^3$ ............................................ A01G 25/00
[52] U.S. Cl. .......................................... 47/67; 47/81; 47/83
[58] Field of Search ...................... 47/33, 39, 48.5, 59, 47/66, 67, 81, 82, 83, 63, 79; 285/252; 206/423

[56] References Cited

U.S. PATENT DOCUMENTS

| | | | |
|---|---|---|---|
| 880,968 | 3/1908 | Bunker | 47/81 |
| 2,072,185 | 3/1937 | Schein | 47/81 |
| 2,081,337 | 5/1937 | Lockyer | 47/81 |
| 2,238,935 | 4/1941 | Gumaer | 47/81 X |
| 3,188,771 | 6/1965 | Ballai | 47/81 X |
| 3,230,872 | 1/1966 | De Groot | 101/127.1 |
| 3,534,498 | 10/1970 | Herrli | 47/81 |
| 3,695,632 | 10/1972 | Kruse et al. | 285/252 X |
| 4,161,085 | 7/1979 | Moffett, Jr. | 47/82 |
| 4,250,665 | 2/1981 | English et al. | 47/66 X |

FOREIGN PATENT DOCUMENTS

| | | | |
|---|---|---|---|
| 4103 | 9/1979 | European Pat. Off. | 47/82 |
| 2525869 | 12/1976 | Fed. Rep. of Germany | 47/83 |
| 1205202 | 2/1960 | France . | |
| 1493029 | 7/1967 | France . | |
| 1503197 | 11/1967 | France | 47/81 |
| 696175 | 10/1965 | Italy . | |
| 2070403 | 9/1981 | United Kingdom | 47/82 |

Primary Examiner—Edgar S. Burr
Assistant Examiner—David A. Wiecking
Attorney, Agent, or Firm—Carver & Co.

[57] ABSTRACT

A plant growing apparatus for growing plants having a tube for a rooting medium and openings in the tube for plants grown in the rooting medium to pass therethrough. First and second end members cooperate with open ends of the tube and have openings therein communicating with the rooting medium. One end member has a reservoir to contain water at an essentially constant level, and a support member extends between the two end members to locate them relative to each other. A flexible web extending from the tube is secured to the support member and restrains the tube against excessive relative movement. A wick extends between the end members and is disposed generally adjacent a side of the tube which is adjacent the web and the support member. In one embodiment, the plants pass generally radially outwardly through openings spaced along a side wall of the tube. In another embodiment, the tube can be partially cut in approximately diametrical planes, the cuts avoiding severing the wick so that adjacent portions of the tube can be swung laterally relative to each other to provide faces to receive the plants which can then pass generally axially from the adjacent portions of the tube. In this latter arrangement the plants also can be watered using conventional spraying, and thus the wick can be omitted.

13 Claims, 9 Drawing Figures

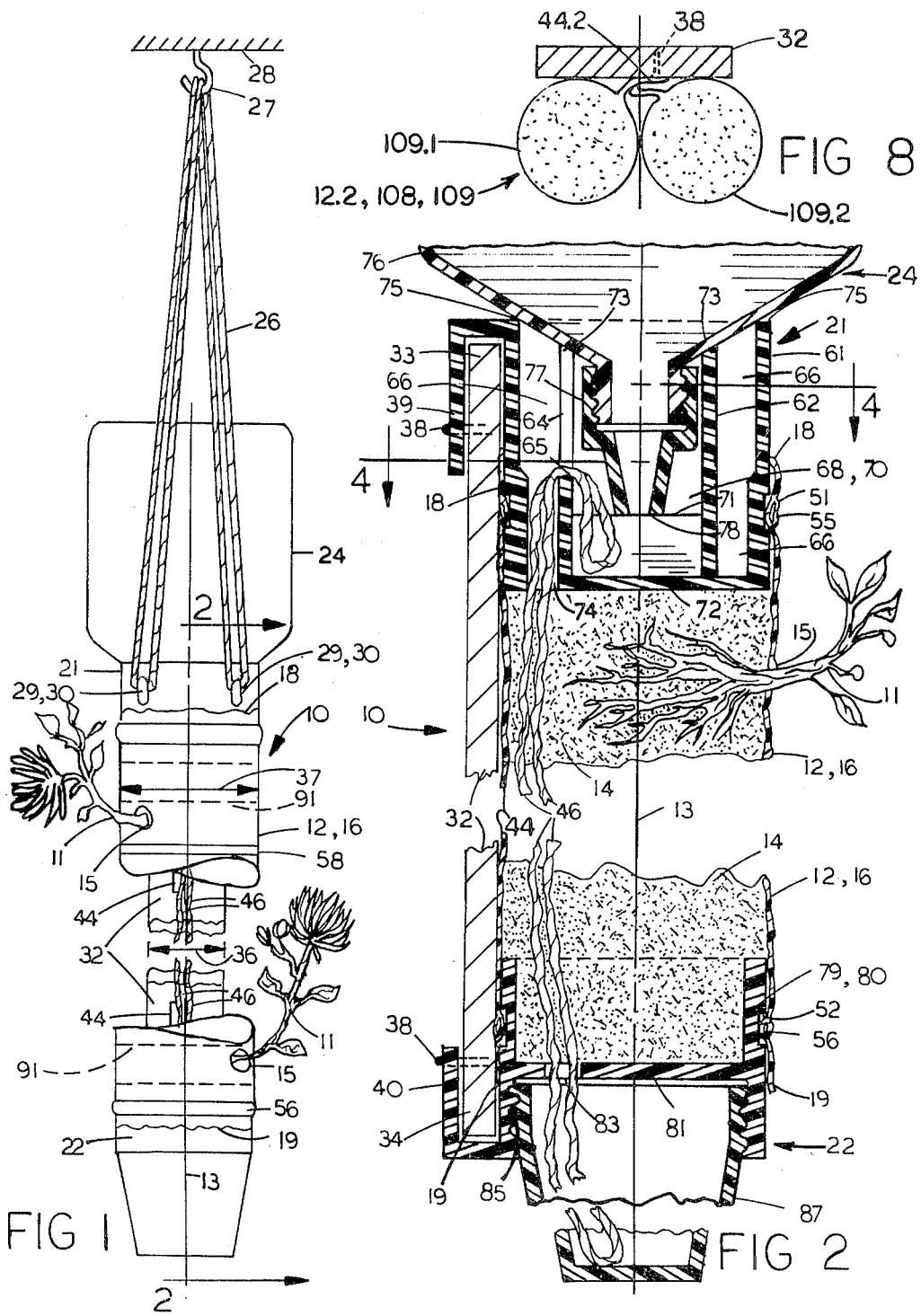

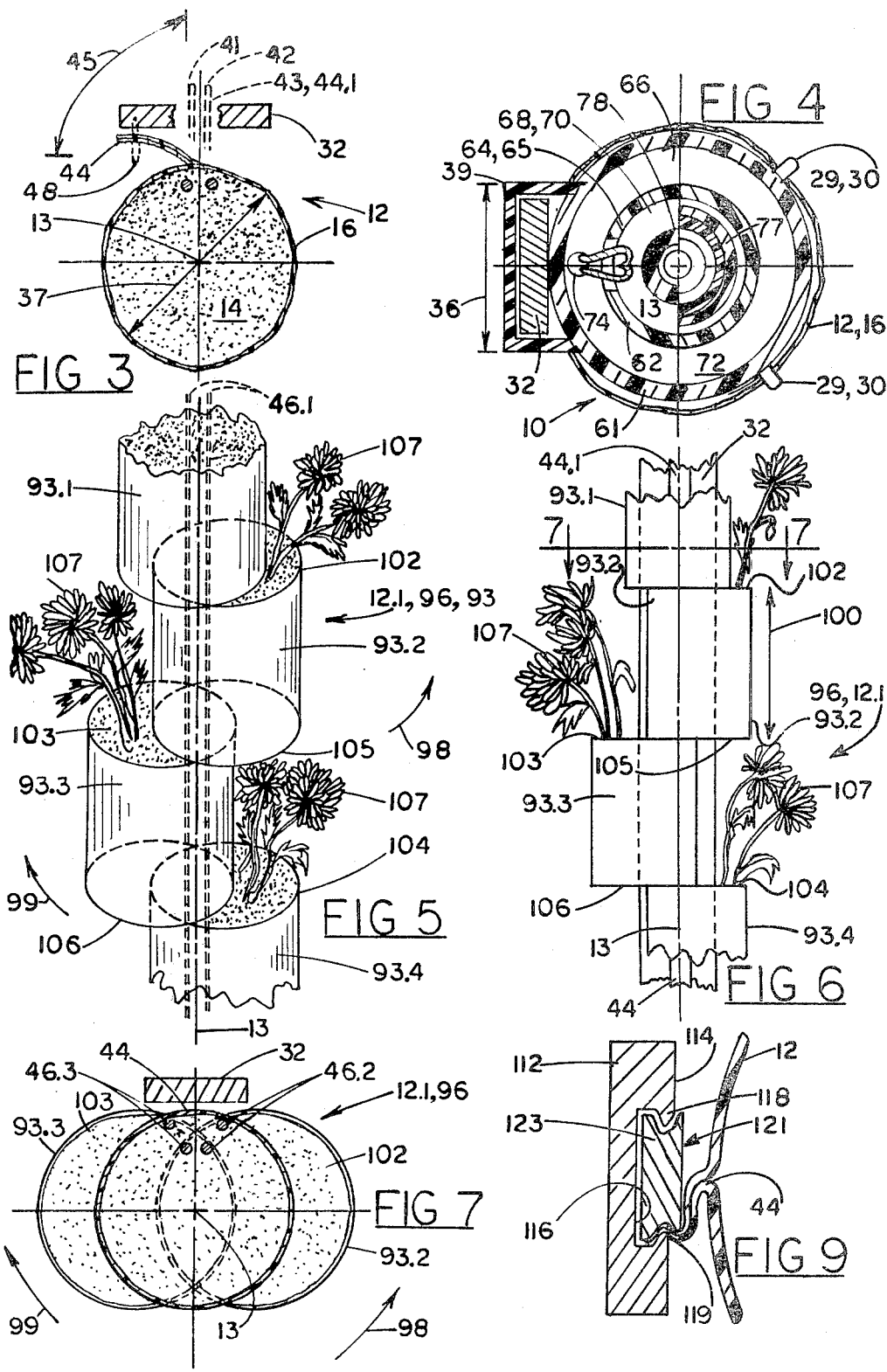

PLANT GROWING APPARATUS

BACKGROUND OF THE INVENTION

1. Field of the Invention

The invention relates to a plant growing apparatus for growing plants therein, particularly an elongated tube type disposed vertically having openings to receive the plants.

2. Prior Art

Many patents have been issued on apparatus for growing plants in rooting medium contained in small containers, such as vertically disposed tubes. Some of these patents disclose means to water the plants using fibrous wicks extending centrally of the tube between at least one reservoir containing a liquid at an end of the tube. One device of this type is shown in French Pat. No. 1,503,197 issued to Vade, in which the tube side wall has openings therein through which plants grow, lower portions of the plant adjacent the root usually growing horizontally outwardly through the opening and then bending to point towards the light source. In this reference, there is no provision shown to ensure that water is distributed equally along the tube, and it is expected that most water would be distributed to the upper plants with the lower plants being starved. Also a rigid, smooth wall tube would likely be unable to respond easily to excessive temperature fluctuations, and does not easily hold the rooting medium which would possibly result in over compression of rooting medium at a lower end of the tube. Furthermore, rigid side walls tend to be difficult to cut and thus it can be difficult to make additional openings to receive plants. Also, because the roots of adjacent plants would tend to intertwine with each other, it would be difficult to separate plants after a while and thus it might be convenient to use this type of tube for growing seedlings which would later require separation.

SUMMARY OF THE INVENTION

The invention reduces the difficulties and disadvantages of the prior art by providing a plant growing apparatus having, in one embodiment an elongated tube with a wick extending through the tube and disposed laterally of the center of the tube, ie. adjacent to one side of the tube. Lateral disposition of the wick permits easier clearing of the roots from the wick which is commonly necessary. Also, lateral wick disposition permits openings of different types to be cut in the tube side wall to provide a series of separated, effectively discrete plant containers to receive plants so that roots of adjacent plants have little tendency to intertwine, thus facilitating separation of seedlings. Furthermore, the tube has a flexible side wall which can be cut easily to provide additional openings to receive plants where desired. The flexible side wall responds easily to temperature fluctuations and also wrinkles easily. The wrinkles form circumferentially extending corrugations which provide a series of "waisted portions" in the tube which support the rooting medium and this tends to reduce over compression that might otherwise occur at the lower end of the tube.

A plant growing apparatus according to the invention has a tube containing rooting medium, the tube having a side wall and open first and second ends. Clearance means are provided in the tube side wall to permit plants having roots immersed in the rooting medium to pass the side wall for growing outside the tube. The apparatus includes first and second end members, a rigid support member and a wick means. The first and second end members cooperate with the first and second ends of the tube respectively and have openings therein cooperating with the rooting medium within the tube. The first end member also has a reservoir portion adapted to cooperate with a water supply to contain water at an essentially constant level. The support member extends between the two end members to locate the end members in a fixed relationship relative to each other and to the support member. The side wall of the tube is flexible and an integral flexible flange extends therefrom the flange extending continuously between the end members along the length of the tube. The flange is adapted to be positioned relative to the tube so as to be secured to the support member so as to restrain the tube against excessive movement relative to the support member and end members. The wick means is fitted within the rooting medium within the tube so as to be surrounded essentially by the rooting medium. The wick means extends continuously between the end members and is disposed generally against a side of the tube adjacent the flange so as to be generally adjacent the support member. The wick means has opposite end portions cooperating with the first and second end members, one of the end portions communicating with the reservoir portion to supply water to the wick means. The wick means is capable of drawing water therealong by capillarity. In one embodiment, the tube side wall has openings therein and the plants grow laterally outwardly through the openings. In a second embodiment, the tube has a plurality of tube portions staggered relative to each other to expose faces of each tube portion to receive plants therein. If desired, the end members and the wick means can be omitted from the second embodiment to form a third embodiment in which the plants can be watered by conventional spraying.

A detailed disclosure following, related to the drawings, describes preferred embodiments of the invention which are capable of expression in structures other than those particularly described and illustrated.

DESCRIPTION OF THE DRAWINGS

FIG. 1 is a simplified, fragmented front elevation of a first embodiment of the plant growing apparatus according to the invention, FIG. 2 is a simplified, fragmented section of the apparatus as seen generally from line 2—2 of FIG. 1, some portions being omitted for clarity, FIG. 3 is a simplified, fragmented transverse section through an approximate middle portion of the tube and support showing a web and wick means of the tube, FIG. 4 is a simplified, fragmented section of the apparatus as seen from line 4—4 of FIG. 2 some portions being omitted, FIG. 5 is a simplified fragmented perspective diagram of portions of the tube only of a second embodiment of the apparatus, showing planes of discontinuities of the apparatus after cutting and separating portions of the tube, FIG. 6 is a simplified, fragmented front elevation of the second embodiment also showing a support member, FIG. 7 is a simplified diagrammatic section through the apparatus as seen from line 7—7 of FIG. 6, some cross hatching being omitted, FIG. 8 which appears on sheet 1, is a simplified diagrammatic section through a third embodiment of the invention, wherein the plane of section is similar to that of FIG. 7, and FIG. 9 is a simplified, fragmented transverse section through an alternative support means and web holding means according to the invention.

DETAILED DISCLOSURE

FIGS. 1 through 4

An apparatus 10 according to the invention is for growing plants 11 therein and has a tube 12 having a central longitudinal axis 13 and containing a rooting medium 14 such as peat moss, sand and vermiculite or other known potting soil compositions. A typical rooting medium would contain approximately 65% peat moss, 5% sand and 30% vermiculite, plus a trace of wetting agent. The tube 12 has a flexible side wall 16, for example of relatively thin polyethylene or polyethylene coated paper having a thickness of between 2 mil and 10 mil, and also has open first and second ends 18 and 19 respectively. The tube has several openings 15 in the side wall 16 to provide clearance means to permit the plants 11 having roots immersed in the rooting medium to pass the side wall for growing outside the tube.

The apparatus includes first and second end members 21 and 22 cooperating with the first and second ends of the tube respectively. The tube is elongated and is adapted to be disposed vertically with the first end member adjacent an upper end thereof. A watering tank 24 is carried on the first end member to feed water to the plants within the tube via a reservoir and constant hydraulic head system as will be described. A cord harness means 26 extends from the first end member to a point of suspension 27 above the apparatus, eg. a hook in a ceiling 28. The watering tank 24 is fitted on the first end member and between the cord harness means to locate the tank above the reservoir to provide water for the reservoir. It can be seen that the first end portion has anchor means 29, such as downwardly pointing hooks 30 spaced peripherally therearound to receive loops of the harness means to attach thereto to permit the apparatus to hang vertically from the point of suspension 27. Thus, as will be described with reference to FIG. 2, weight of water in the tank 24, the cord harness means and cooperation between the tank and the upper end member is all that is required to locate the tank above the tube, thus permitting easy refilling and replacement as required. The rooting medium can contain a slow release fertiliser, in which case the tank 24 would contain pure water. Alternatively the water could contain diluted fertiliser to add nourishment to the rooting medium.

A rigid support member 32 has upper and lower ends 33 and 34 cooperating with the two end members 21 and 22 respectively and is an elongated strip having a width 36 less than maximum cross sectional dimension or diameter 37 of the tube 12. The end members 21 and 22 have outwardly extending brackets 39 and 40 respectively having openings therein generally complementary to the ends 33 and 34 of the strip to receive the ends of the strip therein. A plurality of staples 38 secure the member 32 to the members 21 and 22. It can be seen that the support member extends between the two end members to locate the end members in a fixed relationship relative to each other and to the support member.

Referring mainly to FIG. 3, the tube 12 is formed from a strip of flexible material, such as polyethylene, so that adjacent side edges 41 and 42 of the strip are brought together and a simple flat seam 43, broken outline, is formed, producing a web or integral flange 44.1 as shown. The integral flange 44.1 extends continuously between the end members along the length of the tube and, initially as produced, extends generally radially outwardly from the tube as shown. The web is flexible and can be positioned by swinging through an angle 45 of about 90° to assume a full outline position 44 after which it is secured to the support member by staples 48 passing into the support member which is made from a penetrable material such as wood so as to permit easy insertion of the staples. Alternative means for attaching the tube to the support member are described with reference to FIG. 9. A wick means 46, preferably two separate fibrous thread bundles of string, is fitted within the tube so as to be essentially surrounded by rooting medium and is positioned adjacent the web 44, ie. disposed laterally of the tube, for reasons that will become apparent. The string is preferably synthetic for rot resistance, e.g. polypropylene, and for a tube of between 5 and 10 centimeters diameter, the string can contain between 15 and 25 threads of loose filaments. When a single filament is pulled taut, it is approximately one millimeter thick.

Referring mainly to FIG. 2, the first and second end members have annular grooves 51 and 52 extending around outer surfaces thereof, a portion of each end member having an outer surface having a diameter sufficient to pass into the tube 12 to provide a snug fit therewith. Annular band means 55 and 56 are fitted within the annular groove of the end members 21 and 22 respectively, and are adapted to close a respective adjacent portion of the tube overlying the respective annular groove of the end members so as to sandwich the ends of the tube with the end members and to provide clamping and sealing means for the ends of the tube to retain rooting medium and moisture within the tube. Hot needle means, not shown, can be used to fuse the band means and tube to the end members if needed. Thus, it can be seen that the tube has a flexible side wall and a flexible web extending therefrom, the web being adapted to be secured to the support member so as to restrain the tube against excessive movement relative to the support member and the end members. It can be seen that the tube is located adjacent the support member and supported along the full length thereof, and also at the ends which provides a fairly substantial assembly that can be handled on a commercial basis without requiring exceptional care. Whilst the tube must be protected against accidental penetration, when located against the support member and the two end members, tubes of between 5 cm and 10 cm in diameter and between 0.5 m and 1.5 m in length can be handled safely. If required additional self-adhesive tape wrapping 58 can be wrapped around the tube and the adjacent portion of the support member to support portions of the tube intermediate of the end members to further restrain movement and to help prevent strangulation of the wick means due to weight of the tube and plants. The wrapping 58 can be sufficiently tight on the tube to reduce slightly the diameter adjacent the wrapping so as to "waist" the tube, thus reducing a tendency of the rooting medium to slide down the tube and be excessively compressed at the bottom of the tube. Care should be taken to ensure that the wrapping is not so tight as to rip the tube or constrict roots or the wick means. Any circumferentially extending corrugations or wrinkles that form in the flexible side wall of the tube provide a series of "waisted portions" which also tend to reduce the compression effect above, and thus the flexible tube side wall has advantages over a smooth rigid side wall.

Referring to FIG. 2, the first end member 21 has an annular outer wall member 61 carrying the bracket 39 which serves as a means to locate an adjacent end of the support member. The end member 21 also has an annular inner wall member 62 positioned concentric with and within the outer wall member, the inner wall having a clearance 64 to receive the wick means, the clearance 64 having a lower wall 65. An annular space 66 is defined between the inner and outer wall members and a cylindrical space 68 enclosed by the inner wall member defines in part a reservoir portion 70 containing water, surface of which is designated 71. A circular bottom closure member 72 extends between the outer wall member 61 to provide an essentially sealed lower wall for the inner and outer members, with the exception that the closure member also has an opening 74. The opening 74 communicates with the annular space 66 between the inner and outer wall members to provide communication for the wick means between the rooting medium within the tube 12 and the reservoir portion 70. Concentric upper edges 73 and 75 of the inner and outer wall members are disposed within a theoretical conical surface which is complementary to a conical neck portion 76 of the watering tank 24 so as to support the conical neck portion thereon to serve as tank supporting means to receive thereon a portion of the tank containing water. The watering tank has a threaded cap 77 with a spout having a lower rim 78 disposed beneath the lower wall 65 of the clearance portion 64. It can be seen that when the watering tank is filled with liquid and is inverted to be supported on the tank supporting means, liquid trickles from the tank until the spout lower rim 78 is closed by the water surface 71 in the reservoir portion. An upper portion of the wick means 46 passes through the opening 74 and the clearance 64 and is immersed below the water surface 71, and thus draws water along the wick means to the lower end thereof by capillary attraction. The reservoir is thus maintained at a constant hydrostatic head by the position of the spout, and maintains a relatively constant flow of water by capillary attraction and gravity along the wick means. This is of importance so that water is distributed essentially evenly along the wick means, irrespective of the level of water in the tank 24, and distance of the wick means from the reservoir. Thus the reservoir portion is adapted to contain water at an essentially constant level.

The second end member 22 has a main portion 79 having a cylindrical tubular wall member 80 having the annular groove 52 and supporting the bracket 40 thereon to receive the lower end 34 of the support member. The main portion has a bottom wall closure portion 81 having a clearance opening 83 to receive a lower portion of the wick means passing therethrough, thus communicating with the rooting medium within the tube. An internal thread 85 is provided on an inner wall of the main portion 79 beneath the bottom wall closure portion 81. The second end member has a cup portion 87 having a male threaded upper rim which is received in the internal thread 85 of the main portion. This provides a liquid receiver means to receive a lower end of the wick means and to collect water drawn down the wick through capillarity and gravity, and should have a volume of about one-third to one-half of the tank 24. In summary, it can be seen that the wick means extends between the end members and is disposed generally adjacent the side of the tube having the web or flange, ie. adjacent the flange, so as to be generally adjacent the support means. The wick means has a length longer than the tube so that opposite end portions of the wick means can cooperate with the first and second end members, with one of the end portions communicating with the reservoir portion to supply water to the wick means, which water is then transported into the rooting medium to water plants therein.

OPERATION

The tube is filled with rooting medium, with or without fertilizer, and the tank 24 is filled with water, fertilized if necessary, and positioned above the tube in the holding means. The openings 15 are cut in the tube which is sufficiently soft and flexible to permit use of simple crosswise slits, and seeds or seedlings are inserted in the rooting medium adjacent the opening. In FIG. 1, the tube is shown with the openings 15 in the side wall with the plants 11 extending generally radially therethrough. This is one of the simpler ways of growing plants in this type of tube, and is adequate for relatively short bushy plants, such as petunias, marigolds, lettuces, etc. By providing the wick means adjacent one side wall of the tube remote from the openings so as to be adjacent the support means, it is relatively easy to separate the roots of a plant every week or so from the wick means as follows. The watering tank 24 and the cup portion 87 are removed from the upper and lower ends, and upper and lower portions of the wick means are held in opposite hands to reciprocate the wick axially a few centimeters within the tube. This reciprocation tears the roots away from the wick means to prevent choking of the wick means resulting from excessively dense root structure around the wick. If desired, the tube can be used as a seedling growing device so that as particular plants reach maturity, portions of the tube surrounding the particularly mature plants can be cut with a sharp knife, and the plants and adjacent portions of the tube can be pulled from the tube whilst the wick means remains intact against the support member. With sufficient packing density of rooting medium within the tube, portions of the tube can be progressively separated from the apparatus as plants mature, and immature plants can remain to be fed by the wick means until they also reach maturity. In this way, it is possible to provide a means for growing seedlings for subsequent planting, in which the separated tube portions are stacked vertically after removing from the support means and are gradually removed as the plants mature, the wick means remaining intact throughout this growing process. This is one of the major advantages of the wick means being displaced to one side of the tube and would be considerably more difficult if the wick means passed centrally through the tube as was the practice in the prior art. With a centrally located wick, the roots would be required to be separated from around the central wick which would likely result in excessive damage to the roots and subsequent death of the plant. The provision of a laterally displaced wick has other advantages for an alternative growing arrangement as will be described with reference to FIGS. 5 through 7. Separation of roots of the plants as described above is only appropriate where root balls of the plants are compact and are not excessively intertwined with adjacent plants, eg. the plants are widely spaced along the tube. This limitation is not present in the alternative embodiments of FIGS. 5 through 8. It is noted that excess water passing along the wick means collects in the cup portion 87.

ALTERNATIVES AND EQUIVALENTS

FIGS. 5 through 7, with reference to FIG. 1

Referring briefly to FIG. 1, the tube 12 can be fitted between the end members as a continuous tube without the openings 15, and to provide alternative clearance means for the plants to grow therethrough, a series of spaced diametrical cuts 91 are made. The cuts are shown as broken lines 91 and are made to pass through the tube side wall extending over approximately 300° of tube circumference, but not passing through the wick means or portions of the tube immediately adjacent the support member. The cuts are made with a sharp thin knife so as not to tear the relatively fragile tube side wall, and the knife penetrates the rooting medium to separate it, whilst the wick means is protected by relatively undisturbed rooting medium immediately adjacent the support means. The tube 12 thus is transformed into a series of loosely connected short tube portions.

Referring to FIGS. 5 through 7, the tube 12 is designated 12.1 when the cuts 91 have been made, and a second embodiment of a tube assembly 96 can be easily attained from the loosely connected segmented tube by taking adjacent tube portions generally 93 and displacing them laterally in alternate directions relative to each other and to outer end portions of the tube adjacent the end members. Apart from omitting the openings 15, no other change in structure is required, except that an alternative but similar web 44.1 may be subjected to greater loads and thus may require additional width to provide sufficient slackness. Only the top portion of the tube is shown and the remainder of the tube is similar. The top portion has an outer portion 93.1 of the tube remaining adjacent the end member 21, not shown, and an adjacent portion 93.2 is swung laterally in direction of an arrow 98, and a portion 93.3 is swung in an opposite direction per arrow 99. Similarly, portion 93.4 is swung in direction of the arrow 98 and the remaining portions of the tube are similarly alternately displaced, with the exception of a lowermost portion, not shown, which remains aligned with the second end member. There is sufficient slackness and length in alternative but similar wick means 46.1 to allow portions 46.2 and 46.3 of the wick means in the tube portions 93.2 and 93.3 respectively to be displaced laterally as shown in FIG. 7 so as to follow lateral movement of the respective tube portions.

It can be seen that, when the tube is disposed vertically, each tube portion 93.2, 93.3 and 93.4, etc., has an upwardly exposed crescent-shaped top face 102 through 104, etc. out of which plants 107 grow upwardly and inclined towards the light. Thus the plants grow generally axially of the tube, i.e., parallel to the axis 13, and have little tendency to have bent lower portions which contrasts with the plants growing through the openings 15. As best seen in FIG. 7, the cresent-shaped faces can occupy more than one-half of the cross sectional area of the tube, and thus provide adequate growing space for species of plants that might not be so conveniently grown in the tube having side walls provided with the openings 15 as shown in FIG. 1. When the tube portions 93.2, 93.3, etc. are displaced as shown, it can be seen that each portion has an exposed crescent-shaped bottom face 105, 106, etc. in which the rooting medium is unsupported and remains in the tube due to the packing density of the rooting medium. Provided the rooting medium is maintained sufficiently moist and densely packed, there seems to be little tendency for rooting medium to fall from the unsupported exposed bottom face, particularly when the roots of the plant have become sufficiently established to assist in binding the rooting medium. Each tube portion is essentially separate and discrete from an adjacent tube portion apart from the interconnecting wick means and web. Thus each plant forms a root ball that is also essentially separate from the root balls of adjacent plants, with essentially no intertwining of roots, thus facilitating individual removal of mature seedlings from the apparatus and leaving the remaining seedlings and wick means intact. This is a major advantage of the second embodiment when compared with the first embodiment.

Clearly, these alternately displaced tube portions would not be practical with a tube having a centrally located wick means as the wick would be required to follow the displacements of the center of each tube, which would require considerably more length of wick than that required for a laterally displaced wick. Furthermore, use of a centrally located wick would probably result in accidental severing of the wick when the tube portions are cut. By providing the wick means adjacent the support member, it is relatively protected from accidental severing, and furthermore, the alternating tube portions have only a slight effect on the location of the wick which thus interconnects the adjacent tube portions in an essentially straight line.

In summary, it can be seen that the alternative embodiment of the tube as shown in FIGS. 5 through 7 provides a tube with a plurality of discontinuities, namely the diametrical cuts, within generally diametrical planes so as to provide a plurality of tube portions interconnected by the wick means. The portions are supported by web 44.1 to permit swinging relative to the support means so that adjacent tube portions are staggered relative to each other. This staggering exposes crescent-shaped top faces of each portion to provide the clearance means for permitting plants to pass the tube. Clearly, the staples 48 (FIG. 3) securing the web 44.1 to the support member 32 should be relatively closely spaced along the support member to ensure that each tube portion preferably has at least two staples securing that particular tube portion to the support member. An alternate means of securing the web to the support member to provide continuous support is described with reference to FIG. 9.

Whilst dimensions of the tube are not critical, the following relative dimensions have been found successful. For a tube having a length of approximately 1 meter and a diameter of approximately 5 cm., individual tube portions having lengths 100 of about 10 cm. provide crescent-shaped faces of sufficient area for typical plants, etc. Larger diameter tubes can be envisaged, and the limit of diameter is determined mainly by packing density of the rooting medium within the tube portions, strength of the tube side wall and the means of supporting the tube portion and the ability of the wick means to maintain the rooting medium sufficiently damp to prevent it from drying out and falling through the exposed bottom faces 105, 106, etc. There is a sufficient area of exposed face for each portion to supplement watering by conventional fine water spray, if this is desired.

FIG. 8

A third embodiment 108 of the invention has an alternative tube 12.2 cut in a manner similar to the tube 12.1 of FIGS. 5 through 7, but the wick means 46 is eliminated completely, and thus the end members 21 and 22 can also be eliminated. The tube has an alternative but similar web 44.2 to secure the tube to the support means 32 using staples 38. When cut, the tube 12.2 has a plurality of discrete and separate tube portions 109 extending along the support means, two of which are shown and designated 109.1 and 109.2. Because there is no interconnecting wick means, the web is the only limit on amount of swing of the tube portions, and the web is also the only support. The tube portions can be swung as shown so as to expose essentially circular upper faces 110 and 111, with corresponding circular lower faces, not shown. This provides a greater area than the crescent-shaped faces in the second embodiment, with a corresponding increase in the risk of loosing rooting medium from the unsupported lower face. Care must be taken to avoid loss of rooting medium, and thus longer tube portions would be preferred if larger tube diameters are used. Also the web 44.2 is preferably wider than the web 44.1 to permit a greater swing of the tube portions without a corresponding increase in load on the web where it is stapled to the support means. Because the wick means is eliminated the tube portions can be watered by a conventional fine, gentle water spray onto the exposed faces of the tube portions. Also alternative means to hold the support member vertical can be substituted for the cord harness. Thus in summary, the alternative plant growing apparatus has a tube containing a rooting medium and a support member extending along the tube. The tube has a flexible side wall and a flexible web extending therefrom, the web being adapted to be secured to the support member to support the tube. The tube also has a plurality of discontinuities within generally diametrical planes so as to provide a plurality of essentially discrete tube portions interconnected by the web, the tube portions being supported by the support means to permit swinging relative to the support means so that adjacent tube portions are staggered relative to each other to expose end faces of each portion to accept plants.

FIG. 9

An alternative support member 112 has means to support the tube 12 as a substitute for the staples 48 and has a face 114 generally adjacent the tube 12, the face 114 having an axially extending groove 116 extending between opposite ends of the member 112. The groove has a re-entrant cross-sectional shape as shown defined by opposed groove edges 118 and 119. A retainer member 121 has an inner portion 123 which is generally complementary to the groove 116 so as to cooperate therewith. The web 44 of the tube is inserted partially into the groove 116 and the retainer member is snapped into the groove so as to retain an outer portion of the web sandwiched between the retainer member and the groove to hold the tube against the support member. The support and retainer members are made from a plastic that has sufficient flexibility to permit snapping together with the web located in between as shown. This provides a clean and continuous way of supporting the tube alongs its length, thus eliminating the staples of the previous embodiment. Clearly, other types of grooves and retainer members can be provided, and in general, the face has a locating means adapted to cooperate with the web of the tube and a complementary portion of the retaining member so as to retain the tube against the support member.

What is claimed is:

1. A plant growing apparatus for growing plants therein, the apparatus having a tube containing a rooting medium, the tube having a side wall and open first and second ends, and being adaptable to provide clearance means to permit plants having roots immersed in the rooting medium to pass the side wall for growing outside the tube, the apparatus including:
   (a) a first end member cooperating with the first end of the tube, the end member having an opening therein communicating with the rooting medium within the tube, and a reservoir portion adapted to cooperate with a water supply and to contain water at an essentially constant level,
   (b) a second end member cooperating with the second end of the tube, the second end member having an opening therein communicating with the rooting medium within the tube,
   (c) a rigid support member extending between the two end members to locate the end members in a fixed relationship relative to each other and to the support member,
   (d) the side wall of the tube being flexible and an integral flexible flange extending therefrom, the flange extending continuously between the end members along the length of the tube and being adapted to be positioned relative to the tube so as to be secured to the support member so as to restrain the tube against excessive movement relative to the support member and the end members,
   (e) a wick means fitted within, so as to be essentially surrounded by, the rooting medium within the tube, and extending continuously between the end members, the wick means being disposed generally adjacent a side of the tube adjacent the flange, so as to be generally adjacent the support member, the wick means having opposite end portions cooperating with the first and second end members, one of the end portions communicating with the reservoir portion to supply water to the wick means, the wick means being capable of drawing water therealong by capillarity.

2. An apparatus as claimed in claim 1 in which:
   (a) the tube has a plurality of discontinuities within generally diametrical planes so as to provide a plurality of tube portions interconnected by the wick means, the portions being supported essentially by the flange to permit swinging relative to the support means so that adjacent tube portions are staggered relative to each other to expose generally crescent-shaped faces of each portion to provide the clearance means for permitting plants to pass the tube.

3. An apparatus as claimed in claim 1 or 2 in which:
   (a) the tube is elongated and is adapted to be disposed vertically with the first end member adjacent an upper end thereof,
   (b) the first end member has tank supporting means to support a watering tank thereon in communication with the reservoir.

4. An apparatus as claimed in claim 1 or 2 in which:

(a) the tube is elongated and is adapted to be disposed vertically with the first end member adjacent an upper end thereof,
(b) the first end member having anchor means to hang the apparatus vertically from a point of suspension.

5. An apparatus as claimed in claim 1 in which:
(a) the support means is an elongated strip having a width less than a maximum cross sectional dimension of the tube,
(b) the end members have openings therein generally complementary to ends of the strip to receive the ends of the strip therein.

6. An apparatus as claimed in claim 1 or 5 in which:
(a) the support member is made from a penetrable material,
(b) the flange is secured to the support member by staples.

7. An apparatus as claimed in claim 1 or 5 in which:
(a) the support member has a face generally adjacent the tube, the face having locating means adapted to cooperate with a portion of the flange of the tube,
(b) a retainer member having a portion generally complementary to the locating means and being adapted to cooperate therewith and with the flange so as to retain the tube against the support member.

8. An apparatus as claimed in claim 1 or 2 in which the first end member has:
(a) tank supporting means adapted to receive thereon a portion of a tank containing water,
(b) an outer wall member having means to locate an end of the support member,
(c) an inner wall member positioned within the outer wall member and having a clearance to receive the wick means, the space enclosed by the inner wall member defining in part the reservoir portion,
(d) a closure member extending between the outer wall member to provide an essentially sealed wall for the inner and outer members, and has an opening passing therethrough to communicate with a space between the inner and outer wall members providing communication between the tube and the reservoir defined by the inner wall.

9. An apparatus as claimed in claim 1 in which:
(a) the first and second end members have annular grooves extending around outer surfaces thereof, a portion of the outer surfaces having a diameter sufficient to pass into the tube,
(b) band means adapted to enclose a portion of the tube overlying the annular groove means of the end members so as to sandwich the ends of the tube with the end members and to provide clamping and sealing means for ends of the tube.

10. An apparatus as claimed in claim 2 in which:
(a) cord harness means is adapted to extend from the first end member to a point of suspension above the apparatus,
(b) the first end member also has anchoring means to attach to harness means to suspend the apparatus vertically from the first end member,
(c) a watering tank is fitted on the first end member and between the cord harness means and the point of suspension to locate the tank above the reservoir to provide water for the reservoir.

11. A plant growing apparatus for growing plants therein, the apparatus having a tube containing a rooting medium and further including:
(a) a rigid support member extending along the tube,
(b) the tube having a flexible side wall and an integral flexible flange extending therefrom, the flange extending continuously between ends of the tube and being adapted to be secured to the support member to support the tube,
(c) the tube being adaptable to provide a plurality of discontinuities within generally diametrical planes so as to provide a plurality of essentially discrete tube portions interconnected by the flange, the tube portions being supported essentially by the flange secured to the support means to permit swinging relative to the support means so that adjacent tube portions are staggered relative to each other to expose end faces of each portion to accept plants.

12. An apparatus as claimed in claim 11 in which:
(a) the support member is made from a penetrable material,
(b) the flange is secured to the support member by staples.

13. An apparatus as claimed in claim 11 in which:
(a) the support member has a face generally adjacent the tube, the face having locating means adapted to cooperate with a portion of the flange of the tube,
(b) a retainer member having a portion generally complementary to the locating means and being adapted to cooperate therewith and with the flange so as to retain the tube against the support member.

* * * * *